United States Patent [19]

Thistlethwaite et al.

[11] Patent Number: 4,772,579

[45] Date of Patent: Sep. 20, 1988

[54] CATALYST PRECURSORS

[75] Inventors: Terence Thistlethwaite, Middlesbrough; Johan H. H. ter Maat, Stockton-on-Tees; Peter J. Davidson, Darlington, all of England

[73] Assignee: Imperial Chemical Industries PLC, London, England

[21] Appl. No.: 924,038

[22] Filed: Oct. 28, 1986

[30] Foreign Application Priority Data

Nov. 8, 1985 [GB] United Kingdom ............ 8527663

[51] Int. Cl.$^4$ .................. B01J 23/70; B01J 23/00; B01J 21/08; B01J 21/04
[52] U.S. Cl. .................... 502/338; 502/316; 502/258; 502/439; 502/527
[58] Field of Search ............ 502/439, 527, 338, 316, 502/258

[56] References Cited

U.S. PATENT DOCUMENTS

| | | |
|---|---|---|
| 2,408,164 | 9/1946 | Foster ............................. 502/527 X |
| 2,992,191 | 7/1961 | Erickson ....................... 502/328 X |
| 3,243,386 | 3/1966 | Nielsen et al. ................. 502/328 X |
| 3,403,112 | 9/1968 | Sze et al. ............................ 502/316 |
| 3,644,216 | 2/1972 | Egolon et al. ................. 502/328 X |
| 3,755,199 | 8/1973 | Stefanescu et al. ............ 502/328 X |
| 3,846,341 | 11/1974 | Courty ............................ 502/316 X |
| 3,855,153 | 12/1974 | Chang ............................... 502/316 |
| 3,891,575 | 6/1975 | Brautigam et al. ............. 502/527 X |
| 3,975,302 | 8/1976 | Courty et al. .................. 502/316 X |
| 4,042,738 | 8/1977 | Gulati ............................. 502/439 X |
| 4,089,941 | 5/1978 | Villemin ........................... 423/654 |
| 4,233,187 | 11/1980 | Atwood et al. ................... 423/653 |
| 4,261,862 | 4/1981 | Kinoshita et al. ............. 502/424 X |
| 4,402,870 | 9/1983 | Schwarz ........................... 502/439 |
| 4,420,421 | 12/1983 | Ananese et al. .................. 502/316 |
| 4,456,703 | 6/1984 | Aldridge ........................ 502/524 X |
| 4,471,070 | 9/1984 | Siefert et al. .................. 502/504 X |
| 4,510,261 | 4/1985 | Pereira et al. ................... 502/304 |
| 4,510,262 | 4/1985 | Kim et al. ...................... 502/527 X |
| 4,510,263 | 4/1985 | Pereira et al. ................ 502/527 X |
| 4,521,532 | 6/1985 | Cho .................................. 502/439 |
| 4,618,597 | 10/1986 | Fioto et al. .................... 502/328 X |

FOREIGN PATENT DOCUMENTS

| | | |
|---|---|---|
| 52-7391 | 1/1977 | Japan .............................. 502/338 |
| 56-48249 | 1/1981 | Japan .............................. 502/258 |
| 1484864 | 11/1974 | United Kingdom . |
| 2057905 | 9/1980 | United Kingdom . |
| 430575 | 5/1959 | U.S.S.R. ......................... 502/338 |
| 627850 | 10/1978 | U.S.S.R. ......................... 502/338 |

Primary Examiner—H. M. S. Sneed
Assistant Examiner—William G. Wright
Attorney, Agent, or Firm—Cushman, Darby & Cushman

[57] ABSTRACT

Catalyst precursor units, e.g. for ammonia synthesis catalysts, comprise an iron oxide composition in the form of sintered shaped units of substantially uniform cross section having a plurality, e.g. 13 to 50 or more, through passages of substantially uniform cross section. The passages preferably have a diameter of less than 1.5, particularly less than 0.7, mm.

6 Claims, No Drawings

CATALYST PRECURSORS

This invention relates to catalyst precursors and in particular to an oxidic precursor of an iron catalyst and to a method for producing it.

Iron catalyst precursors, used for example in ammonia synthesis or nitrile hydrogenation, are commonly made by steps including melting iron oxide, normally magnetite, possibly containing small quantities of other oxides, solidifying the melt, and crushing the solid to the required particle size. Such fused, fragmented, catalyst precursors are naturally irregular in shape and this results in serious disadvantages. In particular, the irregular shapes are liable to break during use, leading to bed compaction with consequent increase in the pressure drop encountered by gaspassing through the catalyst bed.

The effectiveness of a random packed bed of catalyst particles depends largely on the geometric surface area (GSA) of the catalyst pieces per unit catalyst bed volume (CBV). However decreasing the particle size, which increases GSA/CBV, has the disadvantage of increasing the pressure drop (PD) required to obtain the required rate of flow of gaseous reactants through the catalyst bed.

We have devised catalysts, and precursors thereto, that have a significantly increased GSA/CBV without any substantial increase in the pressure drop.

We achieve this by making the catalyst precursor in the form of units of substantially uniform cross-sectional area along their length with a plurality of passages of substantially uniform cross-section extending longitudinally through the unit.

As will be described these units are conveniently made by extrusion of a composition containing finely divided iron oxide particles followed by sintering.

Accordingly the present invention provides a catalyst precursor in the form of shaped units of a sintered iron oxide, particularly magnetite, composition, said units having a substantially uniform cross-section and a plurality of passages of substantially uniform cross-section extending longitudinally therethrough.

The overall form of the units is preferably cylindrical but this is not essential: where units having a non-circular cross-section are employed, the external diameter, D, referred to in the following discussion corresponds to the diameter of a circle of area equal to that of the cross-section of the units. In determining this area of cross-section, the cross-sectional area of the through passages is ignored. It is preferred that, in the case of units of non-circular cross-section, the maximum cross-sectional dimension is not more than twice the minimum cross-sectional dimension.

The aspect ratio of the units, i.e.length, L, divided by the external diameter D, is preferably in the range 0.5 to 2. Units having aspect ratios outside this range are more liable to breakage.

To avoid too great a pressure drop, the external diameter, D, is preferably at least 5 mm: however D is preferably not more than 25 mm, particularly not more than 15 mm, or else too great a number of through passages are required to obtain a useful increase in GSA/CBV while retaining adequate strength.

In a random packed bed of the units, the proportion, y, of the bed volume actually taken up by the units will depend on the shape and aspect ratio of the units. For cylindrical units of aspect ratio 1, y is about 0.7.

We have found that a parameter S, defined as $$S = (GSA/CBV) \times (D^2 L)^{\frac{1}{3}}$$

gives a useful indication of the effectiveness of a catalyst unit. It is preferred that the number of through passages and the cross sectional area thereof is such that S is at least 6.3, particularly at least 7.5, where GSA/CBV is expressed in $m^2$ per $m^3$ and D and L are expressed in m.

Since for solid cylindrical units having no passages the the GSA/CBV is $$2y \left( \frac{1}{L} + \frac{2}{D} \right)^3$$

and, for cylinders of aspect ratio 1, y is about 0.7, GSA/CBV for such cylinders is about 4.2/D and so S=4.2. It is seen that, to obtain a value for S of at least 6.3 for such units, the latter have to be provided with a number of through passages of such cross-sectional area that the GSA of each unit is increased by over 50%.

The through passages preferably, but not necessarily, have a circular cross-section: where the passages are not of circular cross-section, the passage diameter, d, referred to in the following discussion, corresponds to the diameter of a circle of area equal to that of the cross-section of the passage.

In the case of cylindrical units having a number, n, of through passages of each of circular cross-section of the same diameter, d;

the GSA of the unit, compared to the GSA of a similar unit having no passages is $$1 + \frac{nd(2L - d)}{D(2D + L)}$$

While a sufficient increase in GSA can of course be achieved by means of a single passage, such a hollow cylinder, usually termed a "ring", will often lack sufficient strength. We prefer that the number and cross-sectional area of the passages is such the actual volume of the unit is at least 60%, particularly at least 70%, of the volume of a corresponding unit having no passages, i.e. the voidage is less than 40, particularly less than 30, %.

In the case of cylindrical units having identical cylindrical passages, the volume of the unit compared to the volume of a corresponding unit having no passages is $$1 - \frac{nd^2}{D^2}$$

i.e. for such cylindrical units it is preferred that $nd^2/D^2 \geq 0.4$, particularly $\geq 0.3$.

A further disadvantage of a single passage is that, if it has a large enough cross-section that a sufficient increase in GSA is achieved, the aspect ratio of the passage will be relatively low unless the aspect ratio of the unit itself is such that the unit will be liable to breakage. It is desirable that the aspect ratio, i.e. L/d, of the passage is at least 6, particularly at least 8, but preferably not more than 40.

A table showing the relative GSA, relative volumes, and the values of the parameter S for cylindrical units of external diameter, D, of 8 mm and aspect ratio 1 having various numbers, n, of cylindrical passages of diameter, d, is as follows:

| n | d (mm) | L/d | Relative volume | Relative GSA | S |
|---|---|---|---|---|---|
| 0 | — | — | 1.00 | 1.00 | 4.2 |
| 1 | 5 | 1.6 | 0.61 | 1.29 | 5.40 |
| 1 | 6 | 1.3 | 0.44 | 1.31 | 5.50 |
| 7 | 1.0 | 8 | 0.89 | 1.54 | 6.47 |
| 13 | 0.5 | 16 | 0.95 | 1.52 | 6.38 |
| 13 | 0.64 | 12.5 | 0.92 | 1.67 | 7.01 |
| 13 | 0.8 | 10 | 0.87 | 1.82 | 7.64 |
| 13 | 1.0 | 8 | 0.80 | 2.01 | 8.44 |
| 20 | 0.5 | 16 | 0.92 | 1.81 | 7.60 |
| 20 | 0.64 | 12.5 | 0.87 | 2.02 | 8.48 |
| 20 | 0.8 | 10 | 0.80 | 2.27 | 9.53 |
| 30 | 0.4 | 20 | 0.92 | 1.98 | 8.32 |
| 30 | 0.5 | 16 | 0.88 | 2.13 | 8.95 |
| 50 | 0.4 | 20 | 0.88 | 2.62 | 11.00 |

Another useful parameter is the term GSA/(A.GV) where A is the surface area of a solid cylinder of length L and diameter D and GV is the geometric voidage of the unit, i.e.

$$1 - (\text{actual volume})/V$$

where V is the volume of a cylinder of length L and diameter D. The value of GSA/(A.GV) is preferably at least 15, particularly at least 20.

The passages preferably have a diameter (or effective diameter if they are of non-circular cross-section), d, of less than 1.5 mm, particularly less than 1 mm. Preferably there are at least 20 passages per $cm^2$ of unit cross-section area.

Preferred units are in the form of cylinders having a diameter of 5 to 15 mm, an aspect ratio of 0.8 to 1.2, and having at least 10 passages extending longitudinally therethrough, each passage having a circular cross-section of diameter less than 0.7 mm. Typically there may be 13 to 50 or more passages of diameter 0.4 to 0.6 mm.

The passages are preferably disposed in an array with a mean spacing between the centres of adjacent passages of, preferably, at least 1.5 d and with the mean spacing between the centres of the passages and the exterior surface of the unit preferably at least d.

In the catalyst bed, the units can be oriented in random fashion or packed regularly. In random orientation, in a small proportion of units, i.e. those oriented with their longitudinal axes near perpendicular to the direction of flow of the gaseous reactants, there will only be a small pressure difference between the ends of the unit and so there will only be a little flow of the gaseous reactants through the passages of those units. However the mean flow through the passages of all the units will be about one half of the maximum flow found in those units where the flow direction through the passages coincides with the direction of maximum pressure gradient.

To make the most effective use of the multiholed units, the number, and cross-sectional dimensions of the passages are preferably such that, the mean flow through the passages of the units, rather than round the outside surface of the units, i.e. between adjacent units, is at least 1% preferably at least 3%, of the total gaseous reactants flow. While the flow of the reactants over the external surface will generally be turbulent, normally the flow through the unit passages will be laminar.

A further benefit of the multiholed units is that, in an exothermic reaction such as ammonia synthesis, each passage through which gas flows acts in a manner akin to a catalyst bed in a quench cooled reactor. Thus gas entering a passage undergoes reaction as it passes along the passage and then emerges from the passage whereupon it is quenched by gas that has flowed past the unit, i.e. through the space between adjacent units. Within each passage essentially adiabatic conditions exist so that a temperature gradient, rising from the passage inlet towards the outlet, as a result of the exothermic reaction, is liable to occur. By this means more rapid reaction may be achieved.

Also the reactants mixture flowing through the unit passages contacts, proportionately, a greater geometric surface area of the unit material than the reactants mixture flowing past the exterior surface of the unit, and so the equilibrium product concentration is liable to be approached more closely by the reactant mixture flowing through the passages than by that flowing past the exterior surface of the unit. Although the fluid flowing through the passages will approach the equilibrium product concentration to a greater extent than that flowing past the external surface of the units, the difference between the reaction driving force, viz the difference between the product equilibrium concentration and the actual product concentration, in the fluid emerging from the passages and that of the fluid that has flowed past the external surface of the unit, will generally be relatively small for most practical systems, provided that a suitable size and number of passages are chosen. Over the whole bed, this results in a more rapid, and/or complete, approach to equilibrium, and so, in some cases, the bed volume can be reduced and/or a higher product concentration can be achieved. Alternatively, or additionally, the flow rate of the reactants through the bed can be reduced, thereby enabling the pressure drop across the bed to decrease. Where, as is customary in, for example ammonia synthesis, unreacted reaction mixture is recycled after separation of the product therefrom, this enables the power required to effect such circulation to be reduced.

The net result is that catalyst beds made of random packed units having multiple longitudinal through passages show a significant increase in activity, compared to catalyst beds of units of similar size but having no through passages, without any significant increase in pressure drop across the catalyst bed.

The provision of the multiple passages through each unit also has the effect of reducing the resistance of a random packed bed of the units to the flow of fluid therethrough so that the pressure difference between the bed inlet and outlet is decreased. If the pressure difference that can be tolerated is about the same as in a bed of units having no through passages, this means that it is also possible to reduce the external dimensions, i.e. L and/or D, of the units slightly in relation to the corresponding external dimensions required when there are no through passages. Since decreasing the external dimensions of the units has the effect of increasing GSA/V, an even greater GSA/V can be achieved with no significant change in the pressure difference across the bed.

As mentioned hereinbefore, the units may be made by sintering extruded products made by an extrusion process utilising a composition containing finely divided iron oxide particles. The size of the latter has an effect on the strength of the units. Preferably essentially all of the particles have a size below 40, particularly below 20, $\mu m$.

Even more particularly the particles preferably have a size such that at least 50% by weight have a size below 10 μm. Preferably at least 90% by weight have a particle size below 10 μm and at least 50% by weight have a size below 5 μm.

After sintering, the units preferably have a density, as measured by reference to their volume in mercury at atmospheric pressure, of at least 4, preferably at least 4.3, g.cm$^{-3}$ and a BET surface area of less than 1 m$^2$.g$^{-1}$.

The iron oxide in the particulate composition may be magnetite ($Fe_3O_4$) but is preferably haematite ($Fe_2O_3$) and may be produced in the desired finely divided state by for example, precipitation or spray drying, plus milling if necessary. Alternatively fused iron oxide or naturally occurring magnetite or haematite can be milled to the requisite size.

The units preferably contain at least 50% by weight of iron in the form of iron oxide. However a proportion of the iron atoms, for example up to 20%, by number of atoms, may be replaced by cobalt atoms.

For use as a catalyst precursor the units will usually contain one or more oxidic promotor materials in addition to iron oxide. Typical promotor materials are lime, magnesia, alumina and/or potassium oxide. Other promotors, such as oxides of rubidium, cesium, beryllium, lanthanides, actinides, molybdenum, vanadium or tungsten, metals such as platinum group metals and minor constituents such as silica, may be present instead of, or in addition to, the above promotors. The nature and proportion of the promotors will depend on the intended use of the catalyst. Thus, for ammonia synthesis, the units will normally contain alumina and an alkali metal oxide and, optionally, magnesia and/or lime. Typically the proportions of such promotors in the units are as follows:

|                   |             |
|-------------------|-------------|
| alumina           | 1–5% w/w    |
| alkali metal oxide| 0.3–2% w/w  |
| lime              | 0–5% w/w    |
| magnesia          | 0–2% w/w    |

For use as a nitrile hydrogenation catalyst precursor, the unit will normally contain up to 5%, e.g. 0.5–5 % w/w, of alumina or magnesia but will not normally contain an alkali metal oxide.

One disadvantage of the incorporation of lime as a flux to aid densification in the compositions used to make sintered iron oxide units is that, on reduction of the iron oxide to metal, there is a tendency of the unit to crack and disintegrate. We have found that by the incorporation of small amounts of magnesium aluminate spinel into the composition from which the sintered unit is made, the tendency to cracking upon reduction of the iron oxide is markedly decreased. The amount of magnesium aluminate spinel that is employed is preferably 0.1 to 1 mole per mole of lime. In order to suppress crack formation, addition of the magnesium aluminate spinel as such is necessary: addition of magnesia and alumina as separate components does not have the desired effect.

Depending on the method of making the units, some or all of the desired promotors may be incorporated into the particulate iron oxide composition. Thus if a dry shaping method is adopted, additives such as cobalt oxide, alumina, magnesia and calcium oxide, or compounds that decompose thereto on heating, e.g. hydrated alumina, calcium or magnesium hydroxides or carbonates, may be mixed with the iron oxide before division of the composition to the desired particle size. Alternatively if the additives have the requisite particle size they may be added to the particulate iron oxide before shaping. Water soluble compounds, e.g. alkalis or alkali metal carbonates, may be incorporated by impregnating the iron oxide composition before or after shaping with a suitable solution e.g. an aqueous solution. Where a wet shaping process is employed, soluble promotor additives may be incorporated into the liquid used to form the mass that is subjected to the shaping process. Such soluble promotors may in some cases assist the shaping process.

Where an alkali metal compound, e.g. potassium carbonate, is incorporated into the composition either before or during shaping and the shaped unit is then sintered, it may be desirable to incorporate some finely divided silica and/or kaolin ($Al_2O_3.2SiO_2.2H_2O$) into the particulate composition in such a quantity that the alkali metal compound reacts therewith, before or during the sintering step, to form compounds such as $M_2O.nAl_2O_3.mSiO_2$, where M is alkali metal, n is typically 0 or 1, and m is an integer, typically of at least 2.

The units are preferably made by a wet extrusion process wherein one or more organic polymeric binders and a liquid such as water or an alcohol is added to the particulate composition prior to extrusion. Where the liquid is water, the binder is preferably a hydrophilic polymer that is strongly self-adhesive, e.g. a solubilised starch, particularly in admixture with a shear-thinning hydrophilic polymer that need not be strongly self-adhesive e.g. corn starch or a polyvinyl alcohol. The use of such binders for wet extrusion of oxidic materials is described in EP-A-No. 134138. The extrusion is conveniently conducted at ambient temperature by forcing the composition through a die, having suitable cores, e.g. wires or filaments of the appropriate cross-section. The extruded product is cut into the desired lengths after, or preferably before, sintering, to form the shaped units. The cutting technique employed should of course be such that the through passages do not become blocked in the cutting process. A suitable cutting technique is described in our UK Application 8527661. Alternatively the units may be made by pelleting or tabletting techniques. In this case the walls of the pelleting die and/or the cores may have a slight taper, for example of up to 3°, to assist in release of the units from the die. It will be appreciated that in such cases the units and/or the passages therein will not have a completely uniform cross section. Pelleting or tabletting techniques are less suitable than an extrusion method when the units are to be made in large numbers and/or have a large number of through passages. To avoid the risk of adjacent units packing so that one unit blocks the ends of the passages through an adjacent unit, the ends of the units are preferably non-planar, e.g. roughened, convex, or provided with at least one projecting member.

After shaping, and, where the shaping process is by extrusion, preferably after cutting the extrudate to the desired length, the shaped product is dried, if necessary, and then, where a binder having an organic component is employed in the shaping step, the organic component is burnt out in a calcination step, preferably at 250°–500° C., in an oxygen containing gas, e.g. air. Such a calcination step may also be advantageous even where no organic binder is employed. The shaped product is then sintered, preferably in an inert, dry, atmosphere, e.g. nitrogen, at a temperature of above 1100° C. preferably above 1200° C. and particularly at least 1300° C. Preferably the sintering temperature is below 1450° C.

Although the iron oxide composition used to make the units may be magnetite, this is less preferred. However when using haematite, whose compositions are more easily shaped, it is desirable to reduce the haematite to magnetite before or during the sintering step. A preferred method of effecting this reduction is by the incorporation of graphite into the haematite composition prior to shaping so that during a heating step prior to, or during, sintering the graphite acts as a reducing agent. The amount of graphite employed should be 1 to 1.5, particularly over 1.2, % by weight of the haematite used.

Instead of effecting the reduction of haematite with graphite, the reduction may be effected with iron by including finely divided iron powder, typically in an amount of 8 to 9% by weight of the haematite in the particulate iron oxide composition.

Such a reduction step should be conducted at above 450° C. in an inert atmosphere. Hence, where a calcination step is employed to burn out any organic materials prior to reduction of the haematite, the calcination should be conducted at a temperature below 450° C.

Like fused products, sintered products have a low surface area and a high density. However sintered products can readily be distinguished from fused products by optical and/or scanning electron microscopy since sintered products have a morphology that is quite different from that of fused products. In particular the sintered units show a significant proportion of vestiges of the finely divided particles used to make the units, although although many of the fine particles will have agglomerated.

The sintered product can also be distinguished from fused products by measurement of the pore volume distribution. Thus the sintered products generally exhibit a porosity of at least 0.01 particularly at least 0.02, $cm^3$ per g of sintered product in the form of pores of radius below 10 $\mu$m. In contrast, fragmented, fused products show negligible pore volume, generally totalling less than 0.005 cm g$^{-1}$ in the form of pores of radius below 10 $\mu$m.

The pore volume distribution may be determined by mercury porosimetry at varying pressures.

The sintered products also exhibit a distinctly different pore volume distribution from that of fused catalysts when the pore volume distribution is determined after reduction of the iron oxide to iron. In this case both the sintered and fused catalysts, after reduction, have an appreciable porosity in the form of pores of radius in the range 100 to 1000 Å (0.01 to 0.1 $\mu$m) as a result of the pores formed by reduction of the iron oxide to iron. However whereas the reduced fused catalysts exhibit only a small amount of porosity, less than about 0.015 ml g$^{-1}$, in the form of pores of radius between 0.1 and 10 $\mu$m, the sintered products, after reduction, generally exhibit a porosity of at least 0.02 $cm^3.g^{-1}$ in the form of pores of radius between 0.1 and 10 $\mu$m.

The density of a bed of standard, fragmented, fused, ammonia synthesis catalyst precursor is typically about 2.5 to 2.8 g.cm$^{-3}$.

With the units of the invention the bed density is the product of the unity density, the volume of the multihole units relative to the volume of units of equal size but having no holes, and the parameter y previously defined.

Since, for cylindrical units of aspect ratio 1, y is about 0.7 and the unit density is generally above 4, and particularly above 4.3, g.cm$^{-3}$ and the relative volume is preferably above 0.6, particularly above 0.7, the bed density will normally be above about 1.7 g.cm$^{-3}$ and often above 2.0 g.cm$^{-3}$. In many cases bed densities above 2.2, particularly above 2.4 g.cm$^{-3}$ can be achieved. In some cases bed densities above those of standard fragmented, fused, catalyst precursor can be realised: for example with cylindrical units of L=D=8 mm having a density of 4.6 g.cm$^{-3}$ typical values of the parameter S and the bed density are as follows

| no. of holes | hole diameter (mm) | bed density g · cm$^{-3}$ | S |
|---|---|---|---|
| 13 | 0.64 | 2.9 | 7.01 |
| 20 | 0.5 | 2.9 | 7.60 |
| 20 | 0.64 | 2.8 | 8.48 |
| 30 | 0.4 | 2.9 | 8.32 |

In some cases it may be desirable, to increase the bed density, to employ as a catalyst bed a mixture of shaped units of two or more distinct sizes and/or shapes.

Reduction of the precursor to active catalyst is conveniently effected by hydrogen at a temperature in the range 300°–500° C. If the catalyst is to be used for ammonia synthesis, the reducing gas used is usually ammonia synthesis gas and is passed over the precursor in the reactor in which synthesis is to take place. Precautions are taken to avoid back-diffusion of water vapour into contact with iron formed by the reduction and to prevent over-heating once ammonia synthesis has begun. Alternatively the precursor can be reduced by nitrogen-free hydrogen. In either event the gas pressure is suitably in the range 1–300, for example 20–120 bar abs. In an alternative procedure the precursor is reduced outside the synthesis reactor and passivated by cool oxygen, diluted with an inert gas, e.g. nitrogen, to give "pre-reduced" catalyst, which thereafter is charged to the synthesis reactor and therein fully reduced.

If the catalyst is to be used for nitrile hydrogenation, the precursor is usually reduced with hydrogen, preferably containing a few percent of ammonia.

The resulting catalyst has an iron surface area significantly greater than that of a fused catalyst.

The invention provides a process of ammonia synthesis over the catalyst and in these preferred conditions:
Temperature °C.: 300–500, especially 350–430.
Pressure, bar abs: 20–250, especially 40–120.
Gas mixture: $H_2/N_2$ up to 3.1, especially 2.5 to 3.0 or (as in our U.S. Pat. No. 4,383,982) 1.5 to 2.3.

The invention provides also a process of hydrogenating adiponitrile to hexamethylene diamine over the catalyst and in these preferred conditions:
Temperature °C.: 80–200
Pressure bar abs: 200–400
State of matter: preferably supercritical
Gas mixture: hydrogen+2–10 parts by weight of ammonia per part of adiponitrile.

The invention is illustrated by the following examples

EXAMPLE 1

In this Example the intrinsic activity of sintered ammonia synthesis catalysts was assessed.

960 g of naturally occurring magnetite ore was blended with 16.0 g of calcined alumina, $\alpha$-$Al_2O_3$, 8.24 g of anhydrous potassium carbonate, $K_2CO_3$, 10.8 g of calcium carbonate, CaCO₃, and 10 g of magnesium stearate as binder. The blended mixture was then homogenised and milled using a vibratory ball mill to a fine powder. All the particles had a size below 20 μm and over 50% by weight of the particles had a size of less than 10 μm.

The milled powder was then compacted between two contra-rotating profiled rolls, to yield elongated, roughly cylindrical, units of diameter approximately 4.0 mm, and length approximately 50 mm. The elongated units were broken into shorter lengths approximately 4 mm long. All of the resultant short units passed through a 4.75 mm sieve, and more than 99% percent of their weight was retained on a 3.35 mm sieve.

The units were then fired in an atmosphere of air to a temperature of 1300° C. to effect sintering, and thereby, densification. As measured by displacement of mercury at atmospheric pressure, the density of the sintered units was 4.3 g.cm$^{-3}$, with a pore volume of 0.037 cm$^3$.g$^{-1}$. Chemical analysis of the units shared the composition of the catalyst to be as follows; expressed in weight percent.

| | |
|---|---|
| CaO | 0.6% |
| K₂O | 0.40% |
| Al₂O₃ | 1.7% |
| MgO | 0.27% |
| SiO | 0.3% |
| Fe₂O₃ | balance. |

The intrinsic catalytic activity of the sintered products was assessed by crushing the sintered material to particles of size between 0.6 and 1 mm. The resultant coarse powder was charged to a laboratory reactor having a catalyst bed 32 mm long and 3.2 mm diameter.

The crushed material was activated by reduction in a 3:1 hydrogen:nitrogen mixture at 50 bar absolute pressure, raising the temperature to 475° C. over 12 hours and holding that temperature for 3 hours. The resultant catalyst was used for ammonia synthesis in the reactor at 50 bar abs and 450° C. at a space velocity of 40000 cm$^3$ of gas per gram of unreduced crushed material (i.e. the catalyst precursor) per hour, and the concentration of ammonia in the gas leaving the reactor was measured. From the ammonia concentration measured at this, and other space velocities, the "initial" rate constant, per unit catalyst precursor weight, was calculated using standard kinetics.

To assess the rate of decline of activity an accelerated ageing procedure was then adopted by increasing the temperature to 550° C. and maintaining that temperature for 6 hours. The temperature was then reduced to 450° C. and the conversion at various flow rates measured. The "final" rate constant, per unit catalyst precursor weight, was then calculated.

The intrinsic catalytic activity of a standard fused catalyst was also determined by the above procedure. In each case three samples of the material under test were employed and the rate constants determined from the average of the ammonia concentrations found.

In the following table the initial and final relative activities are the ratio of the initial and final rate constants, respectively, to the initial rate constant of a standard fused catalyst.

| Sample | NH₃ concentration of exit gas (% v/v) at 40000 cm$^3$·g$^{-1}$·h$^{-1}$ space velocity | | Relative activity | |
|---|---|---|---|---|
| | Initial | Final | Initial | Final |
| Fused | 5.50 / 5.50 / 5.75 | 5.20 / 5.20 / 5.50 | 1.0 | 0.86 |
| Sintered | 6.10 / 6.10 / 6.40 | 6.00 / 6.10 / 6.05 | 1.34 | 1.25 |

It is seen that not only do the sintered materials exhibit a higher initial activity than the standard fused material but also the decline in activity upon ageing is significantly less.

EXAMPLE 2

Haematite was milled to a fine powder, having a median particle size of 3 μm, all the particles having a size below 10 μm.

958 g of the milled haematite powder was then mixed with 31 g of alumina trihydrate, Al₂O₃.3H₂O and 11 g of calcium carbonate, both of which had previously been ground to a similar degree of fineness.

To this mixture was then added 10 g of high molecular weight polysaccharide, ("Zusiplast PS 1", available from Zschimmer und Schwarz, Lahnstein am Rhein, FRG), 40 g of cornstarch, ("Kardek", grade G08010 available from CPC UK Ltd, Industrial Division, Trafford Park, Manchester, UK) and 130 ml of an aqueous solution containing 96 g l$^{-1}$ of potassium carbonate, K₂CO₃, and mixed into the form of an homogenous paste.

The mixture was then extruded at room temperature through a circular die having 13 wires of 0.7 mm diameter suspended as cores. The cylindrical extrudate, having 13 holes extending longitudinally through, was cut into lengths, dried at 30° C. for 12 hours under a humidity-controlled atmosphere, and then heated to 400° C. at a rate of 200° C. per hour, and held at 400° C. until the starch was fully burned out. The shaped pieces were then sintered at 1300° C. in an air atmosphere for 4 hours, and then cooled to ambient over 6 hours.

The sintered, shaped units, which were cylinders of length 6.5 mm and diameter 6.5 mm with 13 holes of diameter 0.6 mm extending therethrough, had a particle density as determined by reference to their volume in mercury at atmospheric pressure of 4.2 g.cm$^{-3}$, and a porosity of 0.043 cm$^3$.g$^{-1}$.

Chemical analysis showed the sintered units to have the following compositions, expressed as percentages by weight:

| | |
|---|---|
| Fe₂O₃ | 96.9% |
| CaO | 0.6% |
| Al₂O₃ | 2.0% |
| K₂O | 0.5% |

12 (approx 10 g) units were mixed with 65 g of fused alumina chips of mean particle size 2.4 to 3.35 mm and charged to a reactor to form a diluted bed 90 mm long and 28 mm diameter. The sintered units were then activated by gradually heating to 475° C. over a period of 8 hours and holding at that temperature for 6 hours, under an absolute pressure of 150 bar of a 3:1 mixture of hydrogen:nitrogen. The space velocity during reduction was 25000 cm³.g⁻¹.h⁻¹.

The activity of the catalyst for the ammonia synthesis reaction was then assessed by measuring the concentration of ammonia in the gas leaving the reactor at a variety of space velocities. The reaction conditions were 450° C., 150 bar absolute pressure and with 3:1 hydrogen:nitrogen.

The above procedure was repeated using shaped units made in precisely the same manner except that the extrusion die had no suspended wires and hence the shaped units had no through passages.

The results are shown in the following table.

| Sample | NH₃ concentration (% v/v) at space velocity V cm³ · g⁻¹ · h⁻¹ | | |
|---|---|---|---|
| | V = 10,000 | V = 15,000 | V = 20,000 |
| No through passages | 9.55 | 7.75 | 6.60 |
| 13 through passages | 10.05 | 8.70 | 7.45 |

This shows the efficiency of the through passages in increasing the catalyst activity.

EXAMPLE 3

The procedure of Example 2 was repeated except that 12 g of ground graphite was incorporated into the haematite, alumina trihydrate, calcium carbonate powder mixture and the sintering, and subsequent cooling, were effected in an atmosphere that was essentially free from oxygen.

The composition of the resulting sintered shaped units was similar to that of Example 2 except that the iron oxide was in the magnetite, Fe₃O₄, form.

These sintered units will have an activity similar to those of Example 2 but, after reduction, will be significantly stronger.

The sintered products of Examples 1-3 each had a BET surface area below 1 m²g⁻¹ and showed, on microscopic examination, vestiges of particles of size below 20 μm. They each exhibited pore volumes of at least 0.02 cm³.g⁻¹ in the form of pores of radius below 10 μm. After reduction they exhibited much increased pore volumes of which at least 0.02 cm³.g⁻¹ was attributable to pores of radius in the range 0.1 to 10 μm.

EXAMPLE 4

Sintered units were made by the procedure of Example 2 but with the incorporation of various proportions of magnesium aluminate spinel, that had been ground to a similar fineness as the haematite, to the haematite/alumina/calcium carbonate mixture.

In order to assess the reduction characteristics of the sintered units a number of the units were charged to a cylindrical reactor of 27.5 mm diameter and 70 mm length to form a randomly packed bed of volume about 40 cm⁻³.

In a first set of experiments, A, while passing a mixture of hydrogen and nitrogen containing 75% v/v of hydrogen through the bed at a rate of 250 liters. h⁻¹, the temperature of the bed was increased to 350° C. over a period of 3 hours and then further increased to 475° C. over a period of 8 hours.

In a second set of experiments, B, the bed was heated to 475° C. while passing nitrogen through the bed at a rate of 250 liters. h⁻¹ and then the nitrogen stream was replaced by the hydrogen/nitrogen mixture containing 75% v/v hydrogen and maintained at that temperature until the iron oxide was fully reduced to iron.

In both sets of experiments, after cooling to room temperature under the hydrogen/nitrogen mixture, the hydrogen/nitrogen mixture was replaced with nitrogen flowing at a rate of 200 liters/h and then, over a period of 30 minutes, the nitrogen was gradually replaced by air. The units were then examined. The results are shown in the following table.

By way of comparison compositions were also made in which the magnesium aluminate spinel was replaced by magnesia.

| Composition Additive | % w/w* | Reduction procedure | Comments |
|---|---|---|---|
| none | — | A | Fragmented, partially pulverised |
| spinel | 0.25 | A | Intact, slightly dusty |
| spinel | 0.5 | A | Intact, slightly dusty |
| spinel | 0.75 | A | Intact, slightly dusty |
| spinel | 1.0 | A | Intact, slightly dusty |
| spinel | 1.0 | B | Little fragmentation and dust |
| magnesia | 1.0 | B | Fragmented, little dust |

*percent by weight of the haematite/alumina/lime mixture.

When the reduction procedure A was performed on units made from a composition from which the lime had been omitted, the units were intact.

EXAMPLE 5

Extrudates were made by the procedure of Example 2 but using a composition also containing 1% w/w magnesium aluminate spinel. In this case the die with the wire cores had 50 cores arranged in three concentric rings of 29, 14, and 6, around a central core. The die and cores were dimensioned such that, after sintering, the extruded units had a length and diameter of 8.5 mm and, in the case of the units with through passages, passages of about 0.48 mm diameter. The particle density was 4.0 g.cm⁻³ and the units with through passages had a voidage of 0.16, a GSA of about 20 cm⁻¹, and a value of GSA/(A.GV) of 17.7. There were 88 holes per cm² of unit cross section.

The chemical composition, by weight, of the units was as follows:

| | |
|---|---|
| Fe₃O₃ | 96.4% |
| Al₂O₃ | 2.3% |
| CaO | 0.6% |
| MgO | 0.3% |
| K₂O | 0.4% |

An adiabatic reactor was used to assess the activity of each type of catalyst. The bed volume was 23.7 liters filling an annular space of outer diameter 203 mm and inner diameter 8 mm and length 1015 mm. The precursors were reduced at 80 bar pressure with a gas mixture containing hydrogen and nitrogen in the molar ratio of 2.35 at a flow rate of 300 m³.h⁻¹ (at STP). The gas inlet temperature was initially 350° C. and was increased to maintain the water concentration below 2000 ppm by volume. When reduction was complete, the inlet temperature was reduced to 350° C. and, after steady state conditions had been established, the ammonia concentration of the gas leaving the bed was measured together with the increase in temperature across the bed. The results were as shown in the following table.

|  | Ammonia concentration (% v/v) | Temperature increase (°C.) |
| --- | --- | --- |
| no passages | 6.6 | 71 |
| 50 passages | 8.3 | 95 |

The effect of the increase in catalytic activity by the use of the 50 hole catalyst on the efficiency of an ammonia plant is illustrated by the following calculated example.

A typical design flowsheet producing about 1000 te/day of ammonia employing a standard fused catalyst of 6-9 mm particle size uses a synthesis loop operating at about 131 bar abs and a circulation rate of about 26000 kg.mol/h. In such a flowsheet the power required for synthesis gas compression and circulation and for refrigeration to recover the ammonia product is typically about 18.6 MW and the heat recoverable from the synthesis is about 30.4 MW. The recovered heat is generally employed to provide that power requirement and to provide at least some of the power and/or heat required in the procution of the synthesis gas and, possibly to provide power for export.

Because of its increased activity, when using the multihole catalyst in place of the standard fused catalyst, the circulation rate required to produce the same amount of product ammonia can be reduced to about 22000 kg.mol/h thus reducing the loop pressure to about 116 bar abs. As a result the synthesis gas compression and circulation, and refrigeration power requirement is reduced to about 16.9 MW and the heat recoverable is increased to about 30.9 MW. By modifying the circulator to permit the rate of circulation to be reduced to about 21000 kg.mol/h but at the same time giving a loop pressure of 121.5 bar abs, an even more efficient process can be obtained since the synthesis gas compression and circulation, and refrigeration power requirement is only about 16.1 MW while the heat recoverable is increased to about 31.1 MW.

We claim:

1. A catalyst precursor in the form of cylinders of a sintered iron oxide composition, said cylinders having a diameter in the range 5 to 15 mm, an aspect ratio of 0.8 to 1.2, and having at least 10 passages extending longitudinally therethrough, each passage being of circular cross section of diameter less than 0.7 mm, the number and size of the passages being such that
   (a) there are at least 20 passages per $cm^2$ of the cylinder cross section,
   (b) the units have a parameter S of at least 7.5, where S is defined by the equation $$S = (GSA/CBV) \times (D^2 L)^{\frac{1}{2}}$$

where GSA/CBV is the geometric surface area in $m^2$ of a random packed bed of volume 1 $m^3$ of the units, D is the diameter in m of the units, and L is the length in m of the units; and
   (c) the units have an actual volume of at least 70% of a corresponding unit having no passages.

2. A catalyst precursor according to claim 1 wherein the cylinders have 13 to 50 through passages.

3. A catalyst precursor according to claim 1 having a density of at least 4.0 $g.cm^{-3}$.

4. A catalyst which comprises shaped units as claimed in claim 1 wherein the iron oxide has been reduced to iron.

5. A catalyst precursor according to claim 1 wherein there are at least 20 passages in the unit.

6. A catalyst precursor according to claim 2 wherein the passages have a circular cross-section of diameter in the range 0.4 to 0.6 mm.

* * * * *